United States Patent
Jacobsen et al.

(10) Patent No.: US 9,523,348 B2
(45) Date of Patent: Dec. 20, 2016

(54) ROTOR BLADE ASSEMBLY WITH SHIM PLATE FOR MITIGATION PITCH BEARING LOADS

(71) Applicant: General Electric Company, Schenectady, NY (US)

(72) Inventors: Eric Morgan Jacobsen, Greenville, SC (US); Adam Daniel Minadeo, Greenville, SC (US); Alexander William Vossler, Greenville, SC (US)

(73) Assignee: General Electric Company, Schenectady, NY (US)

( * ) Notice: Subject to any disclaimer, the term of this patent is extended or adjusted under 35 U.S.C. 154(b) by 562 days.

(21) Appl. No.: 14/036,463

(22) Filed: Sep. 25, 2013

(65) Prior Publication Data

US 2015/0086359 A1 Mar. 26, 2015

(51) Int. Cl.
*F03B 3/12* (2006.01)
*F03D 1/06* (2006.01)

(52) U.S. Cl.
CPC ........... *F03D 1/0633* (2013.01); *F03D 1/0658* (2013.01); *F03D 80/70* (2016.05); *F05B 2250/292* (2013.01); *F05B 2260/79* (2013.01); *Y02E 10/721* (2013.01); *Y02E 10/722* (2013.01); *Y02E 10/726* (2013.01)

(58) Field of Classification Search
CPC ....... F03D 1/0658; F03D 80/70; F03D 1/0633
See application file for complete search history.

(56) References Cited

U.S. PATENT DOCUMENTS

| | | |
|---|---|---|
| 6,783,326 B2 | 8/2004 | Weitkamp et al. |
| 6,942,461 B2 | 9/2005 | Wobben |
| 8,047,792 B2 | 11/2011 | Bech et al. |
| 8,297,929 B2 | 10/2012 | Steffensen |
| 8,341,840 B2 | 1/2013 | Kawano et al. |
| 2008/0104821 A1 | 5/2008 | Erill et al. |
| 2008/0191488 A1 | 8/2008 | Kirchner et al. |
| 2008/0193295 A1 | 8/2008 | Kirchner et al. |
| 2008/0199315 A1 | 8/2008 | Bech |
| 2008/0213095 A1 | 9/2008 | Bech et al. |
| 2009/0022442 A1 | 1/2009 | Bech et al. |

(Continued)

FOREIGN PATENT DOCUMENTS

| | | |
|---|---|---|
| EP | 2 546 512 A1 | 1/2013 |
| JP | 2013137074 A | 7/2013 |
| KR | 20130094075 A | 8/2013 |

OTHER PUBLICATIONS

European Search Report and Written Opinion issued in connection with corresponding EP Application No. 14185084.2-1607 dated Feb. 4, 2015.

*Primary Examiner* — Craig Kim
*Assistant Examiner* — Jason Fountain
(74) *Attorney, Agent, or Firm* — Dority & Manning, P.A.

(57) ABSTRACT

The invention is directed to a rotor blade assembly for a wind turbine designed to mitigate pitch bearing loads. The rotor blade assembly includes a rotor blade, a pitch bearing, and at least one shim plate. The rotor blade includes a body extending between a blade root and a blade tip. The pitch bearing includes an outer race, an inner race, and a plurality of roller elements between the outer race and the inner race. As such, the inner race is rotatable relative to the outer race. The at least one shim plate may be configured between the inner race and the blade root or between the outer race and a hub of the wind turbine so as to mitigate loads experienced by the pitch bearing.

17 Claims, 8 Drawing Sheets

(56) References Cited

U.S. PATENT DOCUMENTS

| | | |
|---|---|---|
| 2009/0087127 A1 | 4/2009 | Larsen et al. |
| 2011/0138893 A1 | 6/2011 | Shiraishi et al. |
| 2011/0142645 A1 | 6/2011 | Nunez Polo et al. |
| 2012/0183703 A1 | 7/2012 | Beaulieu |
| 2012/0263598 A1 | 10/2012 | Thomsen et al. |
| 2012/0328443 A1 | 12/2012 | Yegro Segovia et al. |

ROTOR BLADE ASSEMBLY WITH SHIM PLATE FOR MITIGATION PITCH BEARING LOADS

FIELD OF THE INVENTION

The present subject matter relates generally to wind turbines and, more particularly, to a rotor blade assembly for a wind turbine with one or more shim plates for mitigating pitch bearing loading.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy from wind using known airfoil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

To ensure that wind power remains a viable energy source, efforts have been made to increase energy outputs by modifying the size and capacity of wind turbines. One such modification has been to increase the length of the rotor blades. However, as is generally understood, the loading on a rotor blade is a function of blade length, along with wind speed and turbine operating states. Thus, longer rotor blades may be subject to increased loading, particularly when a wind turbine is operating in high-speed wind conditions.

During the operation of a wind turbine, the loads acting on a rotor blade are transmitted through the blade and into the blade root. Thereafter, the loads are transmitted through a pitch bearing disposed at the interface between the rotor blade and the wind turbine hub. Typically, the hub has a much higher stiffness than the rotor blades. Thus, due to the stiffness differential between the hub and the rotor blades, the pitch bearings are often subjected to extreme, varying and/or opposing loads. For example, the inner race of each pitch bearing (i.e., the portion typically coupled to the rotor blades) may be subjected to varying, localized loads resulting from flapwise or edgewise bending of the rotor blades, whereas the outer race of each pitch bearing (i.e., the portion typically coupled to the hub) may be subjected to lower and/or differing loads. This variation in loading across the inner and outer races can result in substantial damage to the pitch bearings caused by high bearing contact stresses, high blade root resultant moments, and hard pressure spots.

Various systems and methods have been employed to control such varying loads in an effort to protect the pitch bearing. For example, one method involves loosening the nuts on the bolts in line with the hard pressure spots such that gaps are created when the pitch bearing is overloaded. Such a method, however, tends to overload adjacent bolts and is therefore not very effective.

Accordingly, an improved system and method for mitigating loads in a pitch bearing, such as ball and raceway bearing contact stresses, would be desired in the art. For example, a rotor blade assembly having a shim plate configured to mitigate bearing contact stresses would be advantageous.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade assembly for a wind turbine. The rotor blade assembly includes a rotor blade, a pitch bearing, and at least one shim plate. The rotor blade includes a body extending between a blade root and a blade tip. The pitch bearing includes an outer race, an inner race, and a plurality of roller elements between the outer race and the inner race. As such, the inner race is rotatable relative to the outer race. Further, the inner race is coupled to the blade root. The at least one shim plate is configured between the inner race and the blade root so as to mitigate loads in the pitch bearing.

In another aspect a rotor blade assembly for a wind turbine having a rotor blade, a pitch bearing, and at least one shim plate is disclosed. The rotor blade includes a body extending between a blade root and a blade tip. The pitch bearing includes an outer race, an inner race, and a plurality of roller elements between the outer race and the inner race such that the inner race is rotatable relative to the outer race. Further, the outer race is coupled to a hub of the wind turbine. The at least one shim plate is configured between the outer race and the hub so as to mitigate loads in the pitch bearing.

In still another aspect, a method for mitigating loads in a pitch bearing of a wind turbine is disclosed. The method includes providing a rotor blade configured to couple to a hub of a wind turbine via the pitch bearing, the pitch bearing comprising and outer race and an inner race; identifying at least one location on the pitch bearing experiencing a loading; installing at least one shim plate at the location; and, securing the rotor blade to the hub of the wind turbine via the pitch bearing such that the at least one shim plate mitigates the loading in the pitch bearing during operation of the wind turbine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
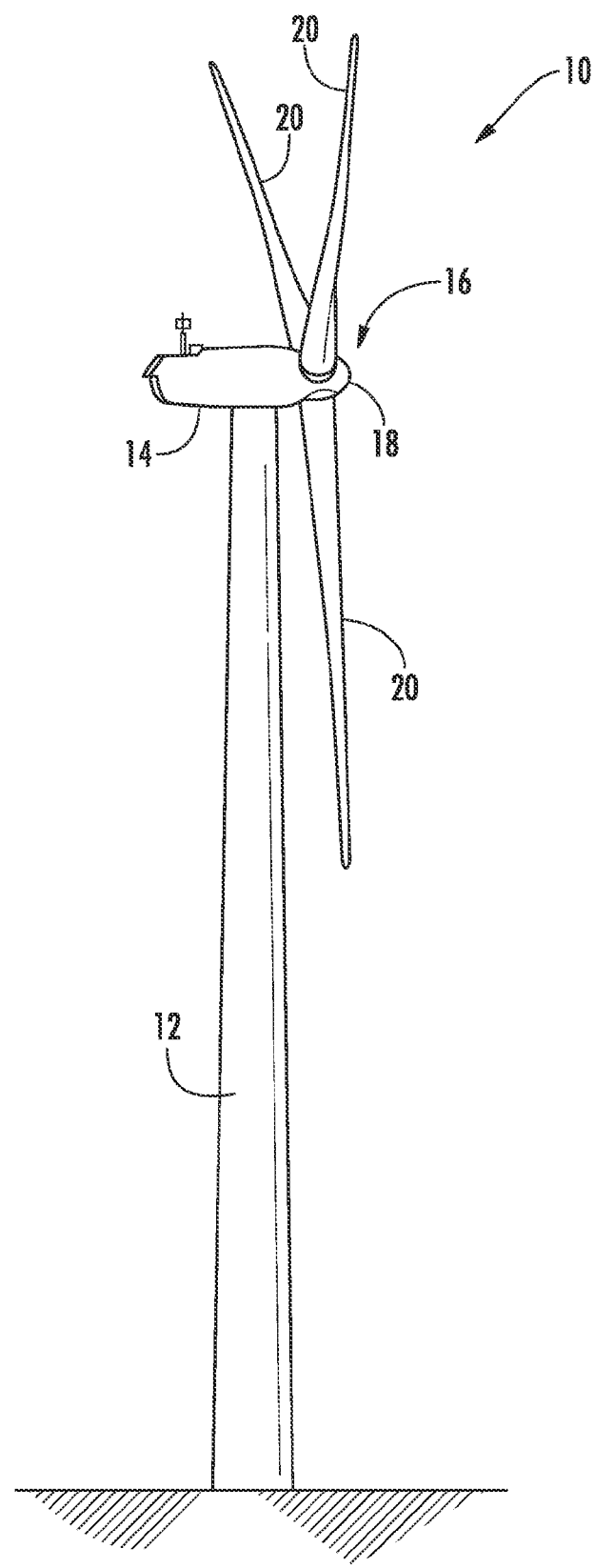
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a rotor blade assembly for a wind turbine having at least one shim plate configured between a rotor blade a hub to mitigate loads in a pitch bearing, such as ball contact stresses. The shim plate is generally a thin, optionally tapered or wedged piece of material, used to fill a gap or space between a rotor blade and a hub of the wind turbine. The shim plate(s) may also be integral with the rotor blade, the hub, and/or the pitch bearing. The pitch bearing generally includes an outer race, an inner race, and a plurality of roller elements between the outer race and the inner race such that the inner race is rotatable relative to the outer race. As such, the at least one shim plate may be configured to fit between the inner race and a blade root of the rotor blade or between the outer race and a hub of the wind turbine so as to mitigate loads in the pitch bearing.

Accordingly, the present subject matter as described herein provides many technical and commercial advantages. For example, the addition of one or more shim plates configured between a new or existing rotor blade and a wind turbine hub can increase bearing load capacity without substantially increasing installation and/or maintenance costs. Further, retrofitting existing wind turbines with one or more shim plates as disclosed herein does not require the use of costly cranes.

Referring now to the drawings, FIG. 1 illustrates a side view of one embodiment of a wind turbine 10 according to the present disclosure. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator (not shown) positioned within the nacelle 14 to permit electrical energy to be produced.

Figure 2:
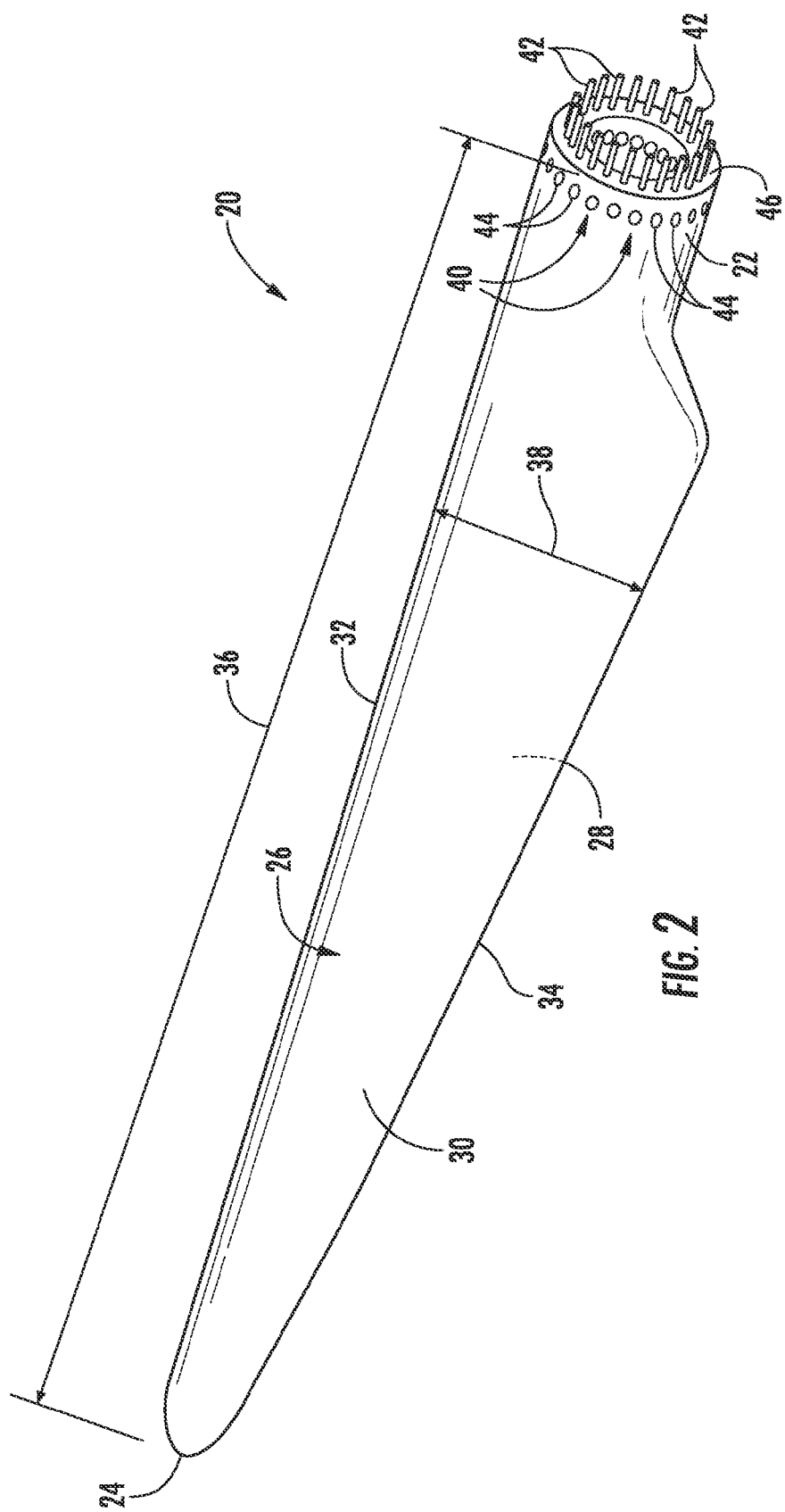
FIG. 2 illustrates a perspective view of one of the rotor blades of the wind turbine shown in FIG. 1.

Referring now to FIG. 2, a perspective view of one of the rotor blades 20 shown in FIG. 1 is illustrated in accordance with aspects of the present subject matter. As shown, the rotor blade 20 includes a blade root 22 configured for mounting the rotor blade 20 to the hub 18 of the wind turbine 10 (FIG. 1) and a blade tip 24 disposed opposite the blade root 22. A body 26 of the rotor blade 20 may extend lengthwise between the blade root 22 and the blade tip 24 and may generally serve as the outer shell of the rotor blade 20. As is generally understood, the body 26 may define an aerodynamic profile (e.g., by defining an airfoil shaped cross-section, such as a symmetrical or cambered airfoil-shaped cross-section) to enable the rotor blade 20 to capture kinetic energy from the wind using known aerodynamic principles. Thus, the body 26 may generally include a pressure side 28 and a suction side 30 extending between a leading edge 32 and a trailing edge 34. Additionally, the rotor blade 20 may have a span 36 defining the total length of the body 26 between the blade root 22 and the blade tip 24 and a chord 38 defining the total length of the body 26 between the leading edge 32 and the trailing edge 34. As is generally understood, the chord 38 may vary in length with respect to the span 26 as the body 26 extends from the blade root 22 to the blade tip 24.

Moreover, as shown, the rotor blade 20 may also include a plurality of T-bolts or root attachment assemblies 40 for coupling the blade root 20 to the hub 18 of the wind turbine 10. In general, each root attachment assembly 40 may include a barrel nut 42 mounted within a portion of the blade root 22 and a root bolt 44 coupled to and extending from the barrel nut 42 so as to project outwardly from a root end 46 of the blade root 22. Alternatively, the barrel nut 42 may be eliminated from the root attachment assembly 40. For example, each of the root attachment assemblies 40 may simply include a threaded root bolt 44 projecting outwardly from the root end 46 of the blade root 22. By projecting outwardly from the root end 46, the root bolts 44 may generally be used to couple the blade root 22 to the hub 18 (e.g., via a pitch bearing 50 (FIG. 3)), as will be described in greater detail below.

Figure 3:
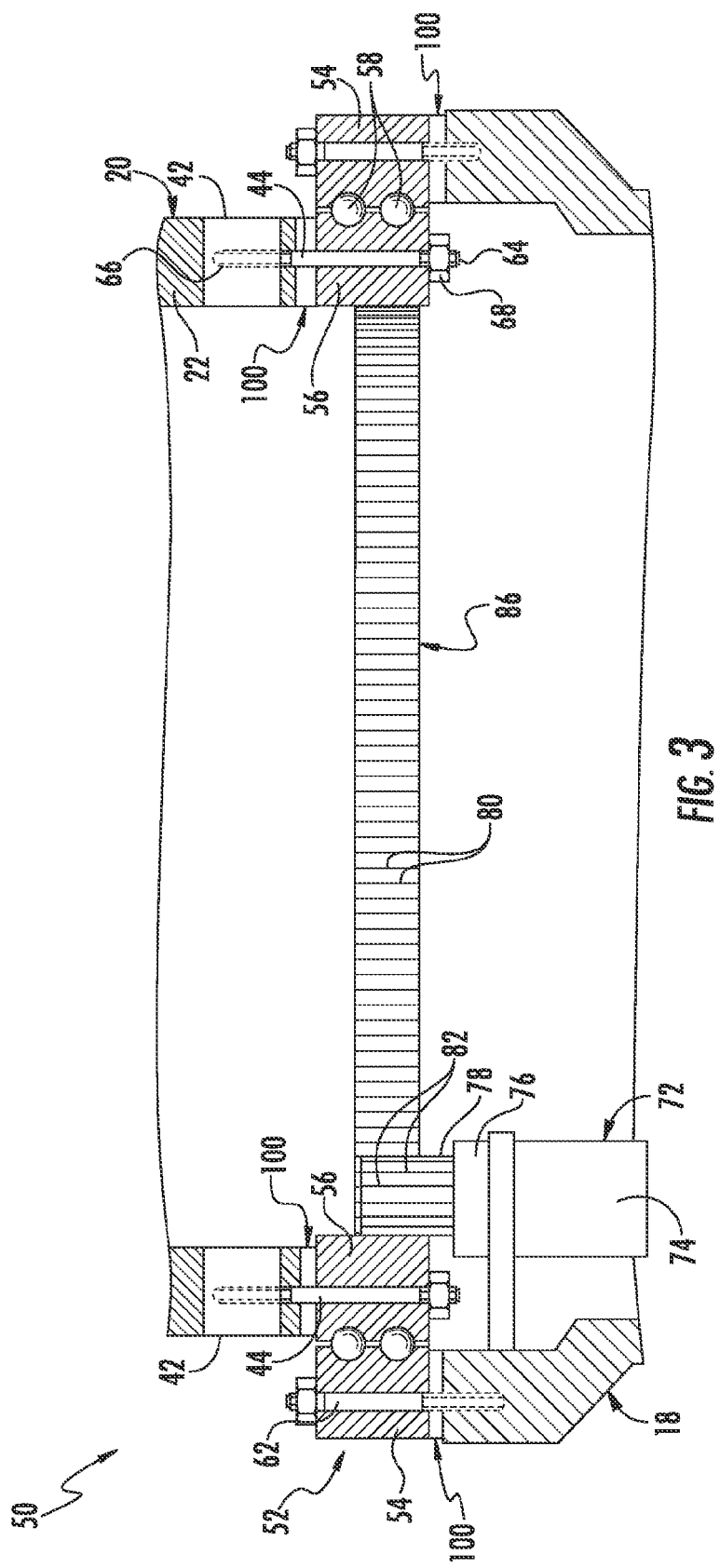
FIG. 3 illustrates a cross-sectional view of one embodiment of the rotor blade assembly in accordance with aspects of the present subject matter.
Figure 4:
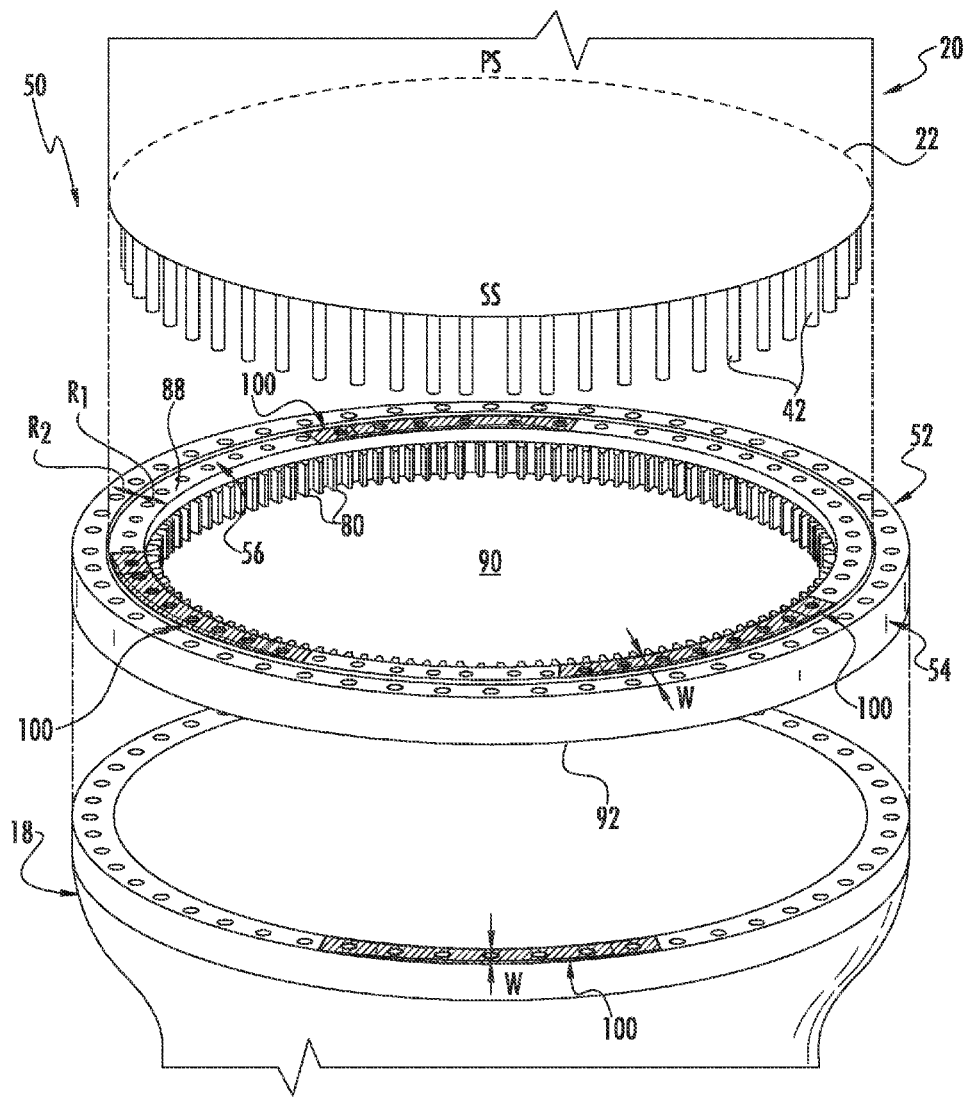
FIG. 4 illustrates an exploded view of one embodiment of a rotor blade assembly according to the present disclosure.

Referring now to FIGS. 3 and 4, several views of a rotor blade assembly 50 having shim plate 100 for mitigating loads in a pitch bearing 52 are illustrated in accordance with aspects of the present subject matter. Specifically, FIG. 3 illustrates a cross-sectional view of the rotor blade assembly 50 having a plurality of shim plates 100 installed between the rotor blade 20 and the hub 18. Similarly, FIG. 4 illustrates an exploded view of the rotor blade assembly 50 according to the present disclosure.

As shown, the rotor blade assembly 50 includes the rotor blade 20 coupled to the hub 18 via the pitch bearing 52. The pitch bearing 52 includes an outer bearing race 54, an inner bearing race 56, and a plurality of roller elements (e.g., balls 58) disposed between the outer and inner races 54, 56. The outer race 54 is generally configured to be mounted to the hub 18 using a plurality of hub bolts 62 and/or other suitable fastening mechanisms. Similarly, the inner race 56 is generally configured to be mounted to the blade root 22 of the rotor blade 20 using root bolts 44. For example, as particularly shown in FIG. 3, the root bolt(s) 44 extend between a first end 64 and a second end 66. The first end 64 of each root bolt 44 may be configured to be coupled to a portion of the inner race 56, such as by coupling the first end 64 to the inner bearing race 56 using an attachment nut 68 and/or other suitable fastening mechanism. The second end 66 of each root bolt 44 may be configured to be coupled to the blade root 22 via a barrel nut 42.

As is generally understood, the inner race 56 may be configured to be rotated relative to the outer race 54 (via the roller elements 58) to allow the pitch angle of each rotor blade 20 to be adjusted. As shown in FIG. 3, such relative rotation of the outer and inner races 54, 56 may be achieved using a pitch adjustment mechanism 72 mounted within a portion of the hub 18. In general, the pitch adjustment mechanism 72 may include any suitable components and may have any suitable configuration that allows the mechanism 72 to function as described herein. For example, as shown in the illustrated embodiment, the pitch adjustment mechanism 72 may include a pitch drive motor 74 (e.g., an electric motor), a pitch drive gearbox 76, and a pitch drive pinion 78. In such an embodiment, the pitch drive motor 74 may be coupled to the pitch drive gearbox 76 so that the motor 74 imparts mechanical force to the gearbox 76. Similarly, the gearbox 76 may be coupled to the pitch drive pinion 78 for rotation therewith. The pinion 78 may, in turn, be in rotational engagement with the inner race 56. For example, as shown in FIGS. 3 and 4, a plurality of gear teeth 80 may be formed along an inner circumference 86 of the inner race 56, with the gear teeth 80 being configured to mesh with corresponding gear teeth 82 formed on the pinion 78. Thus, due to meshing of the gear teeth 80, 82, rotation of the pitch drive pinion 78 results in rotation of the inner race 56 relative to the outer race 54 and, thus, rotation of the rotor blade 20 relative to the hub 18.

Referring now to FIG. 4, an exploded view of the rotor blade assembly 50 according to the present disclosure is illustrated. As shown in the illustrated embodiment, three shim plates 100 are spaced apart circumferentially about the inner race 56 of the pitch bearing 52. As such, the shim plates 100 may be configured between a top surface 88 of the inner race 56 and the blade root 22. More specifically, at least one of the shim plates 100 is located approximate to a pressure side of the pitch bearing 52 corresponding to the pressure side surface 28 of the rotor blade 20, whereas two shim plates 100 are located approximate to a suction side of the pitch bearing 52 corresponding to the suction side surface 30 of the rotor blade 20. Additionally, one or more shim plates 100 may be spaced circumferentially about the outer race 54 of the pitch bearing 52 and between the outer race 54 and the hub 18. For example, as illustrated, one shim plate 100 is located between the outer race 54 and the hub 18. More specifically, the shim plate 100 is configured between a bottom surface 92 of the outer race 54 and the hub 18.

It should be understood that the rotor blade assembly 50 may include any number of shim plates 100 and the shim plates 100 may be arranged at any location along the circumference of the pitch bearing 52 and between either the inner race and the blade root or the outer race and the hub. As such, the shim plates 100 can be located at any location on the pitch bearing 52 experiencing uneven loading, such as, for example, corresponding to a hard pressure spot.

In another embodiment, the top surface 88 of the inner race 56 defines a radial dimension $R_1$ (FIG. 4), whereas and the shim plate 100 defines a width W (FIG. 5) that is equal to or less than the radial dimension $R_1$. As such, in various embodiments, the shim plate 100 fits within the radial dimension $R_1$ of the inner race 56 and does not extend within the open area within the inner race 56. Additionally, in such an embodiment, the width W of the shim plate 100 does not interfere with the outer race 54 when the shim plate 100 is configured between the inner race 56 and the blade root 22. Similarly, the bottom surface 92 of the outer race 54 defines a radial dimension $R_2$ such that the width W of the shim plate 100 is equal to or less than the radial dimension $R_2$. As such, in various embodiments, the shim plate 100 fits within the radial dimension $R_2$ of the outer race 54 and does not interfere with the inner race 56 when the shim plate 100 is configured between the outer race 54 and the hub 18.

Figure 5:
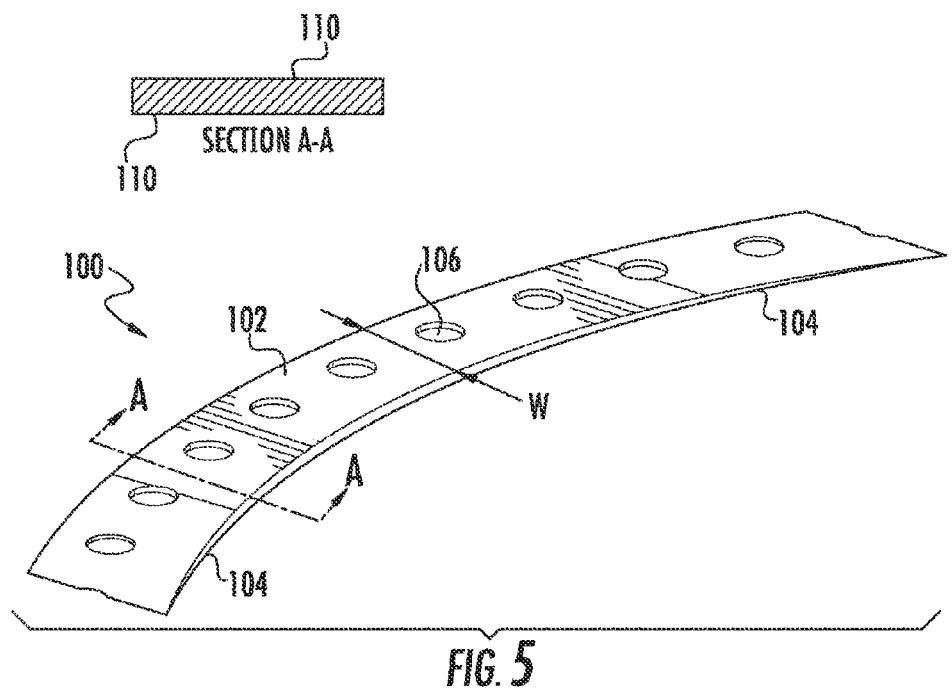
FIG. 5 illustrates a perspective view of one embodiment of a shim plate according to the present disclosure.
Figure 6:
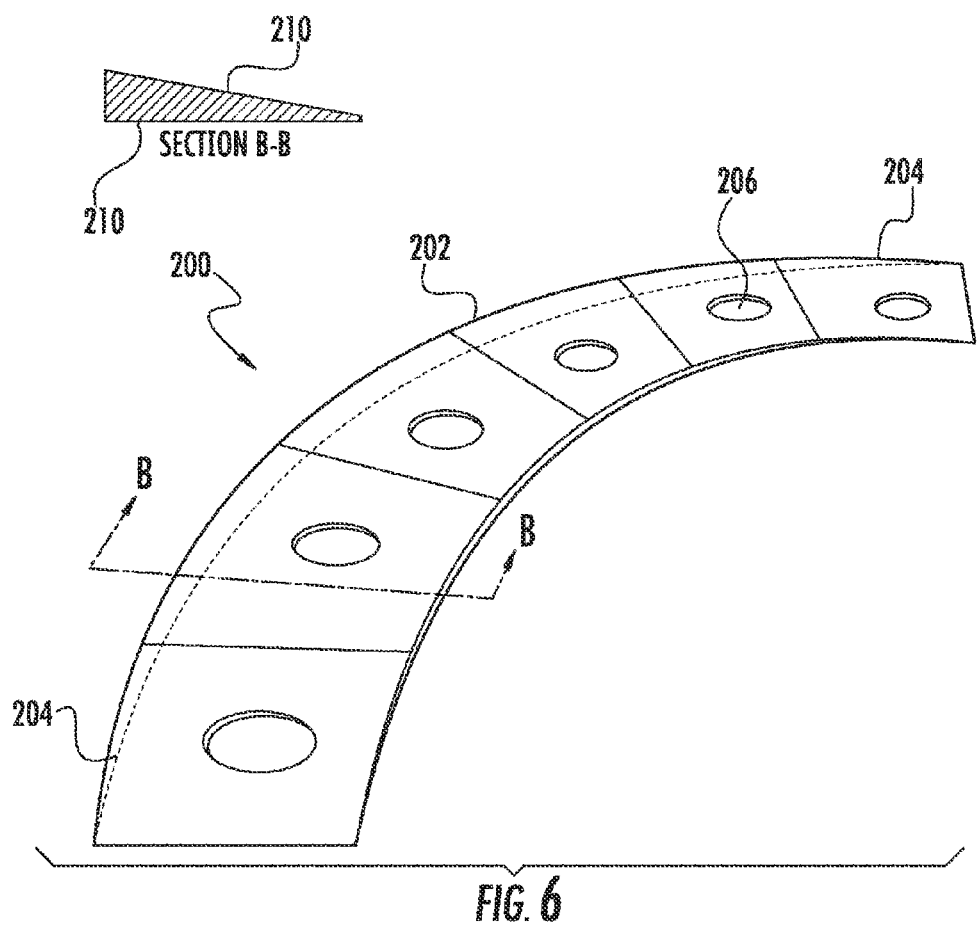
FIG. 6 illustrates a perspective view of another embodiment of a shim plate according to the present disclosure.

Referring now to FIG. 5-11, various detailed embodiments of the shim plate according to the present disclosure are illustrated. For instance, FIGS. 5 and 6 illustrates close-up perspective views of various embodiments of the shim plate according to the present disclosure, whereas FIGS. 7-11 illustrate top and side views of further embodiments of the shim plate according to the present disclosure. As shown specifically in FIGS. 5-8 the shim plate 100, 150, 200 has a base 102, 152, 202 and at least one tapered edge 104, 154, 204. Additionally, as shown particularly in FIG. 5, the base 102 may have a substantially rectangular cross-section as indicated by section A-A. As such, the base 102 has substantially linear radial edges 110. In an alternative embodiment, as shown in FIG. 6, the base 202 may have a substantially tapered cross-section as indicated by section B-B. As such, the base 102 has at least one substantially tapered radial edge 210. Accordingly, the shim plate 200 may include a tapered radial edge 210 across the full shim width W or across only a portion of the shim width W.

Figure 7:
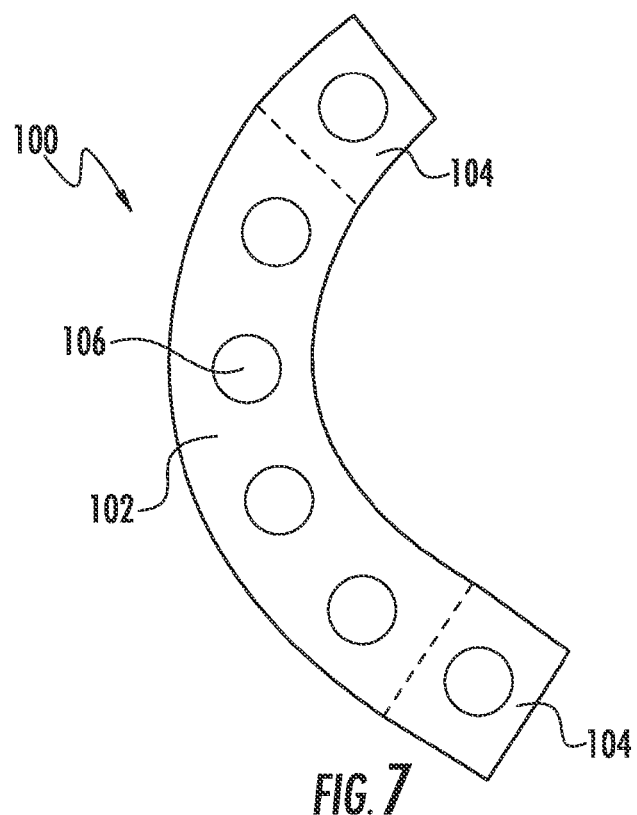
FIG. 7 illustrates a top view of one embodiment of a shim plate according to the present disclosure.
Figure 8:
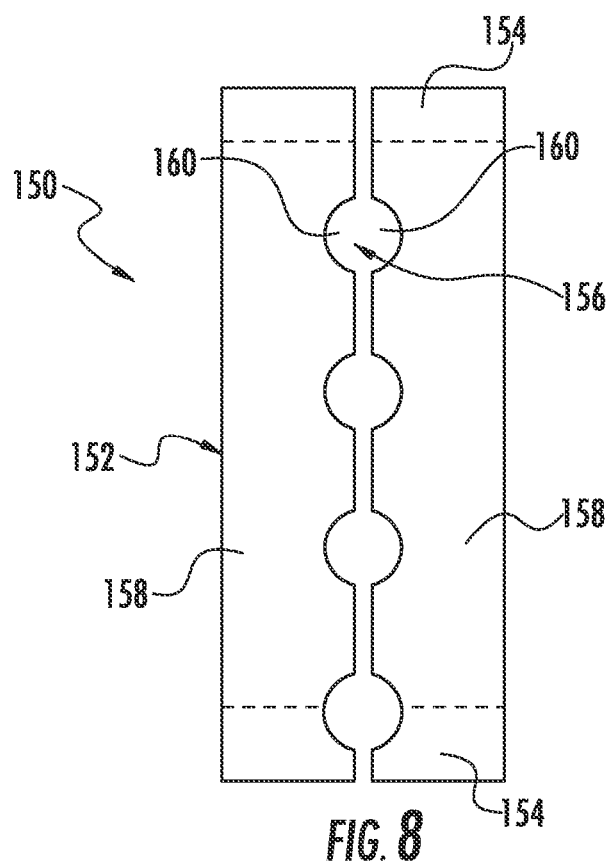
FIG. 8 illustrates a top view of another embodiment of a shim plate according to the present disclosure.
Figure 9:
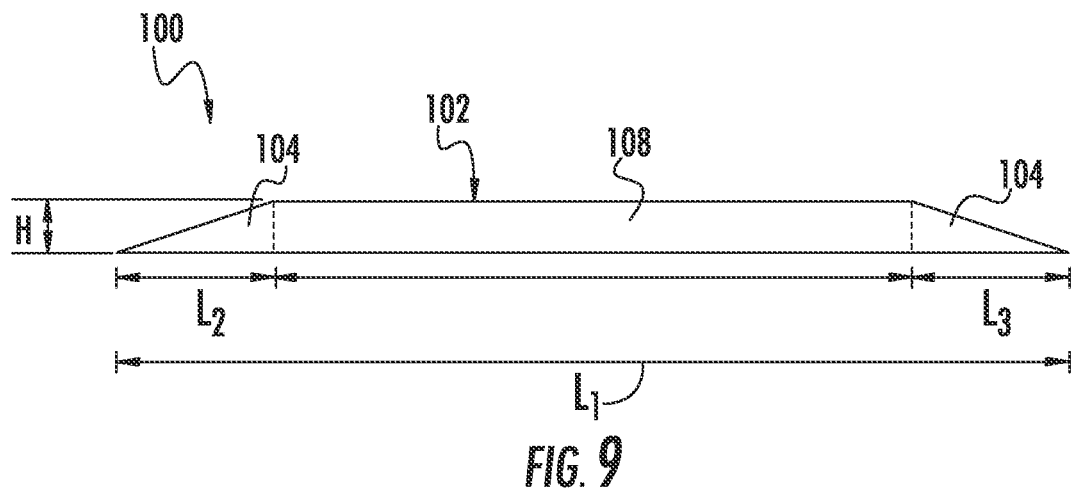
FIG. 9 illustrates a side view of one embodiment of a shim plate according to the present disclosure.

As shown in FIG. 9, the base 102 has a height H (or thickness) and a total length $L_1$. The total length $L_1$ may be any suitable length and typically ranges from about 200 millimeters (mm) to about 3 meters (m). The height H may be any suitable height and/or thickness and typically ranges from about 0.5 mm to about 10 mm, such as, for example, 0.7 mm. Further, the base 102 may have any suitable shape so as to fit in the desired locations as described herein. For example, as shown in FIGS. 5-7, the base 102 has a typically arcuate shape so as to correspond with the shape of the inner 56 and outer 54 races of the pitch bearing 52. In alternative embodiments, the base 102, 152 may have a rectangular, square, triangular, circular, or similar shape. For example, as shown in FIG. 8, the base 152 has a rectangular shape.

The tapered edge(s) 104, 154, 204 are provided to allow intimate contact at all bearing perimeter locations with a finite in-plane shear stress in the blade shell. Further, the tapered edge(s) 104, 154, 204 minimize added friction that may exist due to rotation of the inner 56 and outer 54 bearing races. It should be understand that the term "tapered edges" is meant to encompass at least a tapered-sloped edge, as well as a tapered-stepped edge, as will be discussed in more detail herein. As shown in the embodiments of FIGS. 5 and 9, the shim plate 100 may include opposing tapered edges 104 having corresponding slopes. For example, as depicted in the embodiment of FIG. 9, the slope of each of the tapered edges 104 is equal to $L_2/H$ and $L_3/H$, respectively. The lengths $L_2$, $L_3$ of the tapered edges 104 may be any suitable length and typically ranges from about 250 mm to about 750 mm, such as, for example, 500 mm. As mentioned, the height H may be any suitable height and typically ranges from about 0.2 mm to about 10 mm, such as, for example, 0.7 mm. As such, the corresponding slopes of the tapering edges ranges from about 0.00026 to about 0.04, such, for example, 0.0014. Further, the slopes of the tapering edges 104 may be any appropriate slope to provide appropriate contact between the rotor blade 20 and the pitch bearing 52 and/or the hub 18 and the pitch bearing 52.

Figure 10:
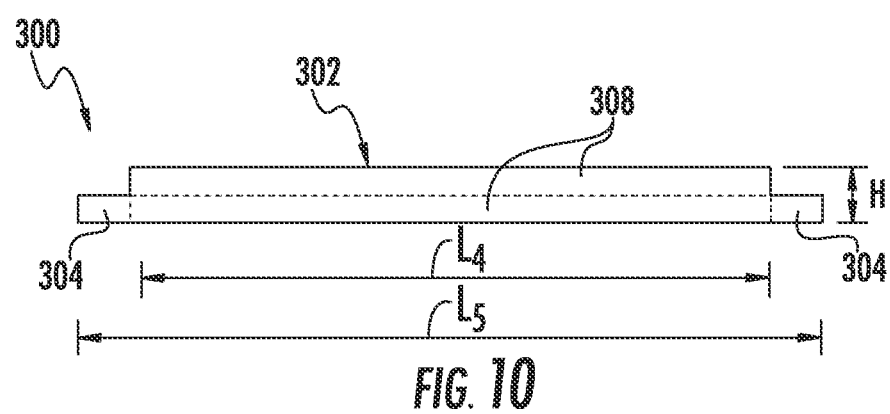
FIG. 10 illustrates a side view of another embodiment of a shim plate according to the present disclosure.
Figure 11:
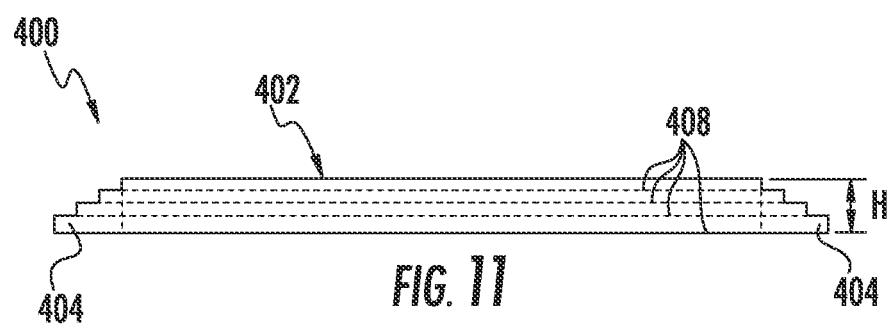
FIG. 11 illustrates a side view of another embodiment of a shim plate according to the present disclosure; and, FIG. 12 illustrates a method for mitigating loads in a pitch bearing of a wind turbine according to the present disclosure.

Alternatively, as shown in FIGS. 10 and 11, the shim plates 300, 400 may include opposing tapered edges 304, 404 having a step configuration. More specifically, as shown in FIG. 10, the shim plate 300 may include multiple shim layers 308 having varying lengths and stacked atop one another until a suitable height H or thickness is obtained. It should be understood that the shim plates 100, 200, 300, 400 described herein may include any number of shim layers 108, 308, 408 from one to greater than one. For example, as shown in FIG. 10, the illustrated embodiment includes two shim layers 308, whereas the shim plate 400 of FIG. 11 includes four shim layers 408. In addition, each of the shim layers 308, 408 has a varying length such that the varying lengths (e.g. $L_4$ and $L_5$) form the opposing tapered edges 304, 404 having a step configuration.

Further, the opposing tapered edges 104, 204, 304, 404 may be identical to one another or may vary according to any of the embodiments described herein. For example, in one embodiment, one of the edges may have a tapered-sloped configuration (as shown in FIG. 9), whereas the opposing edge may have a step configuration (as shown in FIGS. 10 and 11). In another embodiment, both edges may have a tapered-sloped configuration; however, the slopes may vary.

Referring back to FIG. 5, the shim plate 100 may include one or more through holes 106 for coupling the shim plate 100 between the inner race 56 and the blade root 22 or between the outer race 54 and the hub 18. As such, the through holes 106 of the shim plate 100 may correspond to the root bolts 44 of the blade root 22 or the hub bolts 62 of the hub 18. In an additional embodiment, as shown in FIG. 8, the shim plate 150 may include one or more segments 158, wherein each segment 158 has at least one slot 160. The segments 158 may be inner and outer interlocking segments for inserting the shim plate 150 around corresponding bolts 44, 62. As such, the slots 160 of the segments 158 may form the through holes 156 when the segments 158 are connected, i.e. inserted around a blade bolt or a hub bolt. In alternate embodiments, the shim plate 100 may be secured between the inner race 56 and the blade root 22 or between the outer race 54 and the hub 18 using any other suitable means, such as adhesives or friction.

It should also be understood that the shim plate(s) described herein may be constructed of any suitable materials so as to mitigate loads experienced by the pitch bearing. In one embodiment, it is desirable for the joint of the material to be as stiff as possible. As such, in various embodiments, the shim plate(s) may be constructed of metal, such as steel or similar. In a further embodiment, the shim plate may be constructed of a composite material, such as a fiberglass laminate, similar to the rotor blade.

Figure 12:
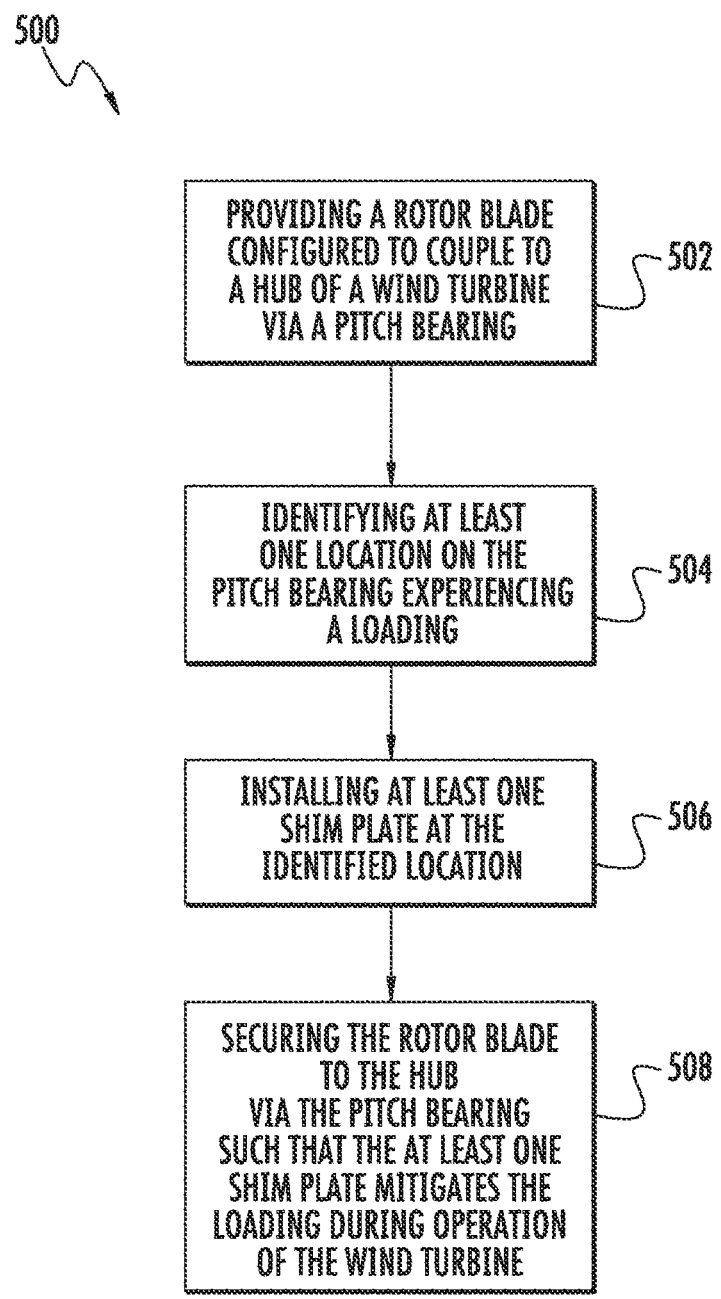

Referring now to FIG. 12, one embodiment of a method 500 for mitigating loads in a pitch bearing of a wind turbine according to the present disclosure is illustrated. The method 500 includes a step 502 of providing a rotor blade configured to couple to a hub of a wind turbine via the pitch bearing. The method 500 includes identifying at least one location on the pitch bearing experiencing a loading (step 504) and then installing at least one shim plate at the identified location (step 506). The method 500 then includes securing the rotor blade to the hub of the wind turbine via the pitch bearing such that the at least one shim plate mitigates the loading in the pitch bearing during operation of the wind turbine (step 508).

In one embodiment, the step 504 of identifying at least one location on the pitch bearing experiencing a loading further includes identifying a spar cap in the rotor blade. As such, one or more shim plates can be placed in-line with the spar cap. In another embodiment, one or more shim plates can be inserted on a pressure side surface of the rotor blade in-line with the spar cap, whereas one or more shim plates can be inserted on the suction side surface of the rotor blade adjacent to the spar cap. In another embodiment, the step of installing at least one shim plate at the identified location further includes installing at least one shim plate between the rotor blade and the hub and spacing a plurality of shim plates circumferentially about the pitch bearing. In addition, the method 500 may include sizing the shim plate to accommodate the loading. In various embodiments, the loading may be representative of bearing ball contact stresses, blade root resultant moments, hard pressure spots or similar.

The step 506 of installing the at least one shim plate at the identified location may completed using a variety of techniques. For example, in one embodiment, where the rotor blade is being retrofitted uptower with the one or more shim plates, the method may include positioning the rotor blade in a six o'clock position relative to the hub, loosening one or more blade bolts until a gap opens between the rotor blade and the hub, inserting the at least one shim plate over one of the blade bolts, and tightening the blade bolts such that the at least one shim plate is secured between the rotor blade and the hub so as to mitigate loads in the pitch bearing. In another embodiment, one or more shim plates may be screwed into an end face of the pitch bearing, such as a top or bottom surface of the pitch bearing. In still an additional embodiment, where one or more shim plates are configured in multiple segments each having a slot, the segments may be inserted around the blade bolts or hub bolts via corresponding slots and then secured between the rotor blade and the hub. In yet another embodiment, one or more shim plates may be inserted over root bolts 44 before the rotor blade is coupled to the hub via the pitch bearing. Additionally, one or more shim plates may be inserted over the hub bolts 62. In another embodiment, the method 500 may include removing one or more of the blade bolts, installing one or more of the shim plates in the location(s) of the corresponding removed blade bolts, and then replacing the blade bolts.

The method 500 as described herein may also include machining the pitch bearing so as to provide one or more shim plates or protrusions integral with the pitch bearing, such as on the top or bottom surfaces of the pitch bearing. In another embodiment, the method may include machining the hub or the rotor blade such that one or more shim plates or protrusions are provided in an end face of the hub or the rotor blade. As such, the non-flat mating surfaces between the pitch bearing and the rotor blade and/or the pitch bearing and the hub mitigates loads in the pitch bearing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, the rotor blade assembly comprising:

a rotor blade including a body extending between a blade root and a blade tip;

a pitch bearing comprising an outer race, an inner race, and a plurality of roller elements between the outer race and the inner race such that the inner race is rotatable relative to the outer race, the inner race being coupled to the blade root, the outer race configured to couple to a hub of the wind turbine; and at least one shim plate configured between the inner race and the blade root, the shim plate comprising one or more through holes configured to receive at least one of a root bolt of the blade root or a hub bolt of the hub so as to couple the shim plate between one of the inner race and the blade root or the outer race and the hub, the shim plate comprising a plurality of segments, each of the segments comprising at least one slot, wherein the slots of each segment form the through holes when the segments are connected, wherein the shim plate is configured to mitigate loads in the pitch bearing.

2. The rotor blade assembly of claim 1, wherein the inner race comprises a top surface defining a radial dimension, the shim plate having a width that is equal to or less than the radial dimension.

3. The rotor blade assembly of claim 1, further comprising a plurality of shim plates spaced circumferentially about the inner race, the plurality of shim plates secured between the inner race and the blade root.

4. The rotor blade assembly of claim 3, wherein at least one of the shim plates is located on a pressure side of the pitch bearing corresponding to a pressure side surface of the rotor blade and at least one of the shim plates is located on a suction side of the pitch bearing corresponding to a suction side surface of the rotor blade.

5. The rotor blade assembly of claim 1, further comprising at east one shim plate between the outer race and the hub.

6. The rotor blade assembly of claim 1, wherein the at least one shim plate comprises a base and at least one tapered edge.

7. The rotor blade assembly of claim 6, wherein the at least one shim plate further comprises opposing tapered longitudinal edges.

8. The rotor blade assembly of claim 1, wherein the at least one shim plate further comprises a tapered radial edge.

9. The rotor blade assembly of claim 1, wherein the at least one shim plate comprises a plurality of shim layers having varying lengths.

10. The rotor blade assembly of claim 9, wherein the plurality of shim layers are stacked atop each other such that the varying lengths form opposing tapered edges having a step configuration.

11. The rotor blade assembly of claim 1, wherein the at least one shim plate is formed integrally with one of the blade root or the pitch bearing.

12. A rotor blade assembly for a wind turbine, the rotor blade assembly comprising:

a rotor blade including a body extending between a blade root and a blade tip;

a pitch bearing comprising an outer race, an inner race, and a plurality of roller elements between the outer race and the inner race such that the inner race is rotatable relative to the outer race, the outer race being coupled to a hub of the wind turbine; and at least one shim plate configured between the outer race and the hub at least one shim plate configured between the inner race and the blade root, the at least one shim plate comprising opposing tapered longitudinal edges, wherein the shim plate is configured to mitigate loads in the pitch bearing.

13. The rotor blade assembly of claim 12, wherein the outer race comprises a bottom surface defining a radial dimension, the shim plate having a width that is equal to or less than the radial dimension.

14. The rotor blade assembly of claim 12, wherein the at least one shim plate further comprises a tapered radial edge.

15. A method for mitigating loads in a pitch bearing of a wind turbine, the method comprising:

providing a rotor blade configured to couple to a hub of a wind turbine via the pitch bearing, the pitch bearing comprising and outer race and an inner race;

identifying at least one location on the pitch bearing experiencing a loading;

installing at least one shim plate at the identified location, that least one shim plate comprising opposing tapered longitudinal edges; and, securing the rotor blade to the hub of the wind turbine via the pitch bearing such that the shim plate mitigates the loading in the pitch bearing during operation of the wind turbine.

16. The method of claim 15, further comprising sizing the shim plate to accommodate the loading.

17. The method of claim 15, wherein the loading is representative of at least one of bearing ball contact stresses, blade root resultant moments, or hard pressure spots.

\* \* \* \* \*